INVENTOR.
CHESTER P. JAREMA
LEONARD M. NIEBYLSKI

*INVENTOR.*
CHESTER P. JAREMA
LEONARD M. NIEBYLSKI

United States Patent Office 3,711,363
Patented Jan. 16, 1973

3,711,363
FOAMED CORE SANDWICH CONSTRUCTION
Chester P. Jarema, Detroit, and Leonard M. Niebylski, Birmingham, Mich., assignors to Ethyl Corporation, New York, N.Y.
Filed Apr. 21, 1970, Ser. No. 30,469
Int. Cl. B32b 3/26, 15/08
U.S. Cl. 161—161          19 Claims

ABSTRACT OF THE DISCLOSURE

A sandwich panel construction comprising two independent outer sheets attached to opposite sides of a foamed metal core. Compared to known sandwich panel construction, the present panels are lightweight, dimensionally stable, strong, fire resistant and resistant to deterioration caused by atmospheric conditions and ordinary aging.

BACKGROUND OF THE INVENTION

A sandwich panel construction wherein outer layers are bonded to a lightweight inner core such as wood or a rigid plastic are known. An example of such a construction is the so-called "hollow core" door. The hollow core in such a construction is generally of a lattice construction and is made of wood or other rigid material. One disadvantage of this type of hollow core construction is that although it is lightweight, it does not have adequate strength for use in applications requiring high strength and rigidity, such as in trailer-van doors, flooring, and the like.

A stronger sandwich panel construction known in the art and which has sufficient strength for use in relatively severe applications is one wherein the inner core is a tough laminate such as plywood. In such a construction, the outer sheets such as aluminum or other metal sheet are directly attached to the tough laminate core. Although this construction has increased strength over the allow core construction, it has three disadvantages; namely, (1) it is relatively heavy (2) it has a tendency to warp, and (3) the laminated core is susceptible to deterioration which results in internal delamination and subsequent failure.

The present sandwich construction provides panels which are (1) relatively lightweight, (2) warp resistant, (3) deterioration resistant and which have strength and deflection characteristics superior to comparable solid sandwich core panels.

SUMMARY OF THE INVENTION

Sandwich panel construction comprising two outer layers attached to opposite sides of a foamed metal core.

BRIEF DESCRIPTION OF THE DRAWINGS

All of the figures (a) are sections or partial sections through the sandwich construction or core component of the sandwich construction of the present invention and (b) are not to scale.

DESCRIPTION OF THE PREFERRED EMBODIMENTS

An embodiment of the invention sandwich panel construction where two layers of material which is solid at room temperature are attached to a foamed metal core. The layers attached to said core may be independent sheets or may be applied as fluid coatings which solidify after being applied to the foamed metal core. A preferred embodiment uses a foamed aluminum core. The density of this foamed aluminum core ranges from 5 to about 50 p.c.f. (pounds per cubic foot), preferably from 5 to about 35 p.c.f., and more preferably from 8 to about 27 p.c.f.

Figure 1:
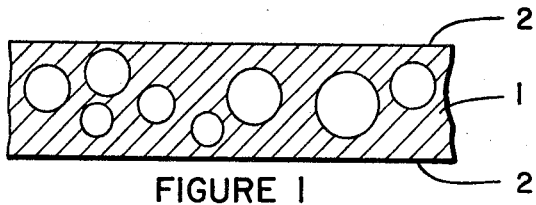
FIG. 1 illustrates a foamed metal core 1 which has a thin integral metal skin 2.
Figure 2:
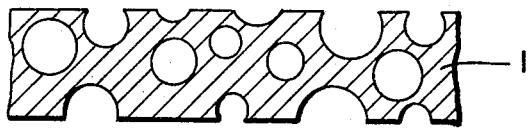
FIG. 2 illustrates foam metal core 1 which has no integral metal skin thereon. The foam surface is marked with numerous cavities.
Figure 3:
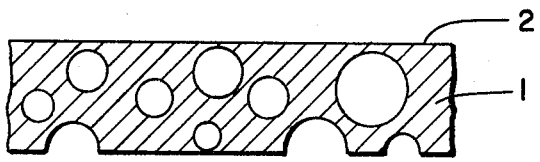
FIG. 3 illustrates a metal foam 1 having an integral metal skin 2 on only one surface.
Figure 4:
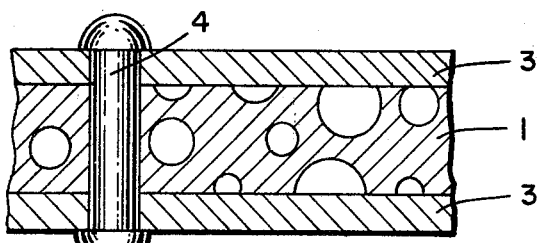
FIG. 4 illustrates metal sheet 3 attached to foamed metal core 1 with a rivet fastener 4.
Figure 5:
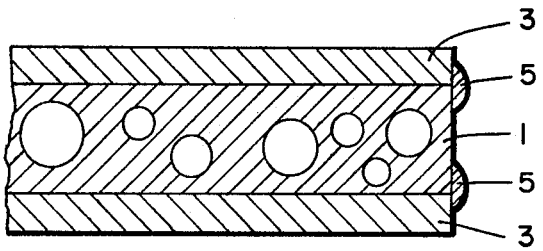
FIG. 5 illustrates metal sheet 3 attached to a foamed metal core 1 by means of welded joints 5.
Figure 6:
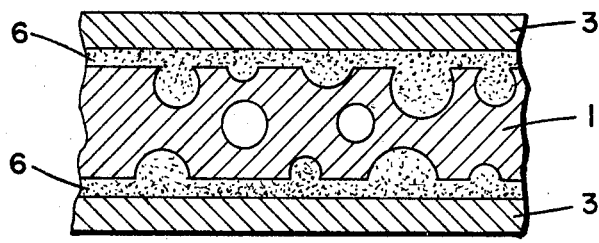
FIG. 6 illustrates metal sheet 3 attached to a foamed metal core 1 with an adhesive 6.
Figure 7:
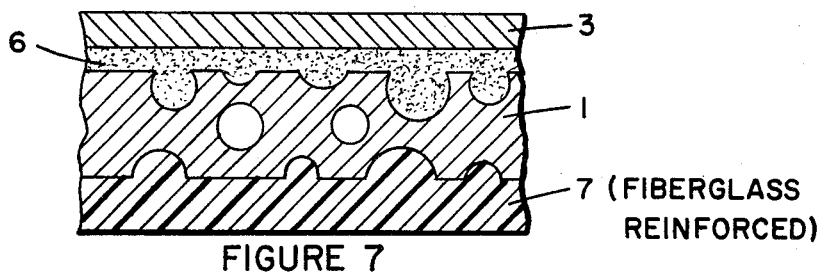
FIG. 7 illustrates a foamed metal core 1 with a metal sheet 3 attached with an adhesive 6 to one side of the said core and a thermoset organic polymer layer reinforced with fiberglass 7 on the core side opposite the metal sheet.
Figure 8:
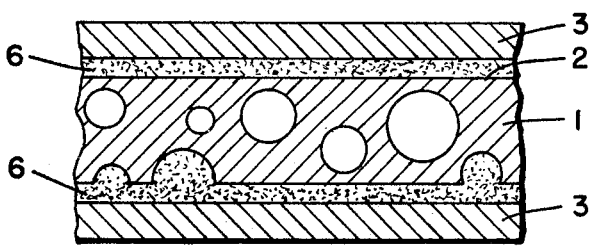
FIG. 8 illustrates a foamed metal core 1 having a metal skin 2 on only one side, with metal sheet 3 attached thereto with an adhesive 6.
Figure 9:
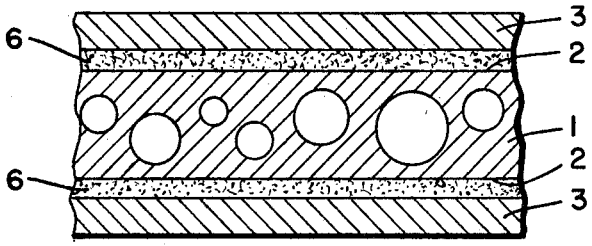
FIG. 9 illustrates a foamd metal core 1 having a metal skin 2 on both sides, with metal sheet 3 attached with an adhesive 6.
Figure 10:
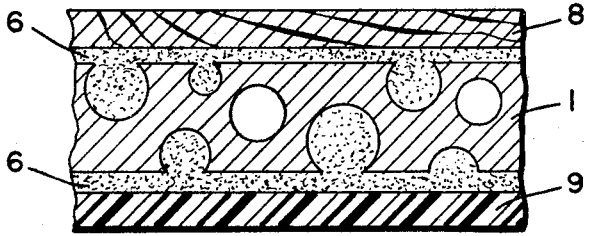
FIG. 10 illustrates a foamed metal core 1 with one wood outer layer 8 and one synthetic elastomer outer layer 9, each bonded to the core with an adhesive 6.

As FIGS. 1 and 3 illustrate, the foamed core may have an integral metal skin covering one or both of its surfaces; or the core may have no such metal skin thus providing a surface having numerous cavities therein, as illustrated by FIGS. 2 and 3. Regarding the metal skin, it is ordinarily an integral part of the foam core. This metal skin can be formed during the metal foaming process by collapse of the outer foaming surface. It is desirable that this skin be kept very thin in order to maintain a relatively low foam density.

The foam core having no integral skin covering is obtained when the skin is cut off the foamed metal; or when a thick section of metal foam is sliced into thinner sections.

The core having a skin thereon provides a substantially continuous relatively smooth surface and thereby requires the use of relatively small amounts of adhesive when the outer layers are thus bonded to the core. The core having no skin, while requiring slightly more adhesive than the core having a skin, affords the capability of additional mechanical bonding between the adhesive layer and the foamed surface. This additional mechanical bonding is achieved because the adhesive can flow into the acvities provided at the surface of a non-skin bearing core. Nevertheless, both types of cores are useful in the preparation of the sandwich panel construction of the present invention.

Various foamed metals may be used as cores for the present panel construction. Examples of useful metals are lead, tin, copper, zinc, tantalum, titanium, alloys of these metals such as steel, brass, and the like.

A preferred foamed metal is foamed aluminum. By aluminum is meant substantially pure aluminum as well as aluminum alloys containing 80% or more and preferably 90% or more aluminum. The following aluminum alloys are examples of useful alloys for preparing foam cores:

Alcoa alloy:
    7075 (1.6% Cu, 2.5% Mg, 0.3% Cr, 5.6% Zn, remainder Al)
    2024 (4.5% Cu, 0.6% Mn, 1.5% Mg, remainder Al)
    5086 (0.45% Mn, 4.0% Mg, 0.1% Cr, remainder Al)
    6063 (0.4% Si, 0.7% Mg, remainder Al)
    Almag 35 (6–8% Mg in Al)

Alcoa alloy—Continued
  1000 series Al (99.6% minimum Al)
  2011 (5.5% Cu, 0.5% Pb, 0.5% Bi remainder Al)
  2218 (4.0% Cu, 1.5% Mg, 2% Ni, remainder Al)
  3005 (1.2% Mg, 0.4% Mg, remainder Al)
  4042 (12.2% Si, 0.9% Cu, 1.1% Mg, 0.9% Ni, remainder Al)
Alcoa alloy:
  4043 (5% Si, 95% Al)
  8280 (1.5% Si, 1.0% Cu, 0.5% Ni, remainder Al)
  Magnalium—70% Al, 30% Mg The foamed metals used in the present construction may be prepared by processes known in the art. In general, such processes involve blowing molten metal with a suitable gas generating agent such as lithium hydride, titanium hydride, zirconium hydride and the like. Air properly entrained in a molten metal may also be used in preparing such foam. Where a blowing agent such as a metal hydride is used, a viscosity control additive may be used in the molten metal during the foaming process to help control the foam density pore uniformity. Representative examples of suitable processes for preparing foamed metal are found in U.S. 3,297,431, U.S. 3,300,296 and U.S. 3,305,902.

As pointed out above, foamed aluminum is a most preferred core material. The density of the foamed aluminum may vary over a wide range. Generally, foamed aluminum having a density of less than about 50 p.c.f. can be used. Foams ranging from 5 to 35 p.c.f. are preferred; densities ranging below about 27 p.c.f. are more preferred; and a foam density ranging from about 8 to about 27 p.c.f. is most preferred.

The outer layers which are attached to the foamed metal core in the present construction may be of any suitable material which is preferably solid at room temperature. Suitable materials are exemplified by wood, metal, thermoplastic organic polymers, thermoset organic polymers, both reinforced and non-reinforced, glass, elastomers, and the like.

The outer layers may be applied to the core either as independent sheets of suitable metal or as a liquid phase which later solidifies to form a material which is solid at room temperature.

When sheet material is used, the outer layers may be attached by mechanical means such as for example rivets, screws, and other similar fasteners; pseudo mechanical means may also be used for example soldering or welding sheet material to the core.

A preferred method of attaching sheet materials to the core is by use of a suitable adhesive. Suitable adhesives are epoxy resins, polyester resins, polyurethane resins, acrylonitrile resins, polyvinylchloride resins and the like.

As pointed out above, outer layers may also be applied to the foamed metal core as fluid materials (liquids, pastes, gums, gels and the like) which will harden to a solid outer layer. These materials may simply be substances which are heated to make them fluid and which solidify on cooling. Examples of such materials are acrylonitrile/butadiene/styrene resins, polystyrene, glass and the like. Another example of a suitable material is polyvinylchloride plastisol which is fused by heating after application to the core. Most preferred materials are organic polymers which can be chemically and/or thermally tough, impervious surface. Examples of useful polymers are the polyester resins, the epoxy resins, the phenolic resins, the urea formaldehyde resins, polyurethane resins and other similar substances. These organic polymers may also be used in conjunction with reinforcing material such as fiberglass, flocked fibers, asbestos, powdered metal, wood flour and the like.

Sandwich panel construction in which one layer is a sheet material and the other layer is a fluid material which has hardened can also be prepared.

The density of the foamed metal core in the present panel construction may be varied. As light a foam as practicable is used in combination with proper outer layers so that the requisite strength of panel is obtained at as low a weight per cubic foot of finished sandwich construction as possible. In the case of the preferred foamed aluminum cores, foam densities ranging from about 5 to about 50 p.c.f. are useful; the 5 to 35 p.c.f. range is preferred; and the 8 to 27 p.c.f. range is most preferred.

Preparing the present sandwich panel construction will generally depend upon the type of attachment required for securing the outer layer to the core. Where the panel utilizes mechanical means such as screws or rivets, known methods and available equipment can be used. Where the outer layers are attached to the foamed metal core by soldering or welding, the soldered or welded joint is ordinarily made at the outside edges of the sheet material.

In preparing the present sandwich panels the preferred technique is to use an adhesive to bond the sheet materials directly to the core. Unlike the mechanical or pseudo mechanical approach, this method of attachment affords a sandwich panel with smooth, uninterrupted surface in which the outer layer material is uniformly bonded to the aluminum core over its entire surface. In addition, panels may be constructed using any combination of the three attachment techniques set out above.

For the adhesive technique, adhesive systems which are available in the art may be used. Ordinarily, the adhesive systems are thermosetting organic polymer resins and elastomers. By thermosetting is meant that the fluid polymer resin and/or elastomer can be chemically or thermally cured or hardened forming a solid, substantially infusible material. Many chemical classes of such adhesives are available, for example, polyester resins, epoxy resins, polyurethane resins, urea formaldehyde resins, acrylonitrile resins, phenolic resins and the like. Any such adhesive system which will effect a good bond between the outer layers and the foamed metal core can be used. The epoxy, the polyester, the polyurethane systems and systems which utilize mixtures of these resins are preferred.

When preparing a sandwich panel using the adhesive technique an adequate amount of adhesive should be applied over the entire outer layer surface. This is to ensure fullest contact between the adhesive and the outer layer and between the adhesive and the core. Where the core has no metal skin thereon, better results are obtained when sufficient adhesive is used (1) to fill substantially all the cavities on the core surface, and (2) to provide a thin layer of adhesive over substantially the entire bonding surface. In addition, sufficient pressure is ordinarily applied to the panel sandwich while the adhesive is curing or hardening; and this is to ensure uniform and adequate contact between the adhesive and the surfaces being bonded. The adhesive may be applied to the outer layer sheet surface alone, to the core surface alone, or to both surfaces. Furthermore, the sheet surface may be treated or prepared for applying the adhesive using adhesive art recognized techniques such as acid etching, Parkerizing, metal grit blasting, Bonderizing, sanding, and the like. In the case of metal sheet, the sheets are ordinarily degreased before the adhesive is applied.

The following general procedure was used in preparing a series of preferred sandwich panel constructions.

PROCEDURE FOR PREPARING METAL ADHESIVE BONDED FOAMED METAL CORE PANELS

The foamed metal core and outer layer sheet material are cut to the desired size. The metal sheet material is then degreased; the bonding surface is then lightly scored, for example, by sanding; and the sheet is degreased again. Commonly, the degreasing is accomplished by washing with a suitable solvent such as a hydrocarbon (hexane and the like) or a chlorinated solvent.

The adhesive is then applied uniformly over the degreased, sanded sheet surface. The adhesive coated sheet is then placed on the metal aluminum core and the sandwich is placed in a suitable press. The sandwich is held in the press under sufficient pressure until the adhesive has set properly. The length of time required in the press will be dependent on the setting time of the adhesive.

After removal of the panel from the press, the sandwich construction is complete.

Where one outer layer of the sandwich is applied as a fluid which later cures and/or solidifies (for example, a polyester resin reinforced with fiberglass) the fluid layer is applied to the aluminum core and allowed to set or harden. In order that the solidified fluid layer have a smooth surface, a smooth sheet of material coated with an anti-adhesive coating, for example, Teflon, can be laid on the fluid layer during the setting up or hardening period. After the fluid layer has hardened, the Teflon coated sheet is removed.

The following series of sandwich panels were prepared using this general procedure. Hexane was used to degrease the sheet metal outer layers; the sheets were scored by light sanding; and the panels were held in the press at room temperature for 12–24 hours to effect the bonding.

deflection in inches at failure were all recorded. The data thus obtained is presented in the following table.

TABLE I.—FLEXURAL TEST DATA

| Test | Panel construction | Test panel thickness (in.) | Test panel weight (lbs.) | Load in pounds to deflect | | Failure load (lbs.) | Deflection at failure (in.) |
|---|---|---|---|---|---|---|---|
| | | | | 0.1″ | 0.2″ | | |
| 1 | Commercial A[2] | 0.995 | [3] 8 | 870 | 2,145 | 3,800 | 0.37 |
| 2 | Commercial B[4] | 1.04+ | [3] 10 | 1,160 | 3,100 | 5,900 | 0.4 |
| 3 | Example 1 | 0.828 | 8.59 | 1,140 | 2,875 | [5] 4,000+ | 0.35 |
| 4 | Example 2 | 0.813 | 7.93 | 1,150 | 2,780 | 4,000+ | 0.35 |

[1] Size of the test panel was approximately 17″ x 23″.
[2] Commercial A is a commercial sandwich panel used for trailer van doors which is a sandwich of nominal 22 mil Galvannealed steel sheet/3/4″ plywood core/27 mil aluminum alloy sheet.
[3] Average.
[4] Commercial B is a commercial sandwich panel used for trailer van doors which is a sandwich of nominal 22 mil Galvannealed steel sheet/1″ plywood core/27 mil aluminum alloy sheet.
[5] Test discontinued with no failure at 4,000 lbs.

A comparison of the data in Table I clearly illustrates improved strength and resistance to deflection afforded by the present sandwich construction. Where commercial plywood core panel (Test 1) required only 870 pounds load to deflect 0.1″ and only 2145 pounds load to deflect 0.2″, a comparable foamed aluminum core panel (Tests 3 or 4) required 1140+ pounds load to deflect 0.1″ and 2780+ pounds load to deflect 0.2″; and where the commercial panel (Test 1) failed at 3800 pounds, load, the present panel (Tests 3 and 4) did not fail at 4000 pounds load. Thus, it is evident that the present foamed aluminum core panel construction is clearly stronger and more rigid than a commercial plywood core panel of substantially the same unit weight (8 lbs. per test panel).

Furthermore, the test data shows that the lighter weight panels of the present invention (Tests 3 and 4=8.25 pounds avg.) are substantially equal in resistance to deflection and failure to a much heavier commercial plywood core panel (Test 2=10 pounds avg.). In addition, it is also important to note that the present panel construction is thinner than either of the commercial plywood core panels.

| | Density (p.c.f.) | Thickness (inches) | Outer layers[2] | | Total adhesive[4] (grams) | Finished sandwich panel[1] | |
|---|---|---|---|---|---|---|---|
| | | | 1 | 2 | | Density (p.c.f.) | Thickness (inches) |
| Example: | | | | | | | |
| 1 | 25.8 | 53/64 | 22 mil steel sheet | 25 mil aluminum sheet | 263 | 45.9 | 0.828 |
| 2 | 23.0 | 48/64 | do | 32 mil aluminum sheet | 225 | 43.1 | 0.813 |
| 3 | 16.0 | 48/64 | do | 25 mil aluminum sheet | 271 | 38.3 | 0.797 |
| 4 | 16.1 | 47/64 | 26 mil steel sheet | 32 mil aluminum sheet | 266 | 40.5 | 0.781 |
| 5 | 16.0 | 51/64 | 27 mil steel sheet | do | | 45.7 | 0.828 |
| 6 | 16.6 | 51/64 | Fiber glass reinforced polyester.[3] | 25 mil aluminum sheet | | 28.2 | 0.828 |

[1] All cores were a foamed aluminum.
[2] The steel sheet was a commercial zinc coated steel called "Galvanneal"; the aluminum sheet was aluminum alloy 6061-T6.
[3] The polyester was a commercial two-component system (Ireson's Super Polyester Resin); the fiber glass reinforcement was on layer of 1½ oz. random fiber glass mat.
[4] The adhesive used was a commercial two-component epoxy system (Scotch Weld 2216-BA).

As stated above, an important feature of the present panel construction is that it affords high strength and resistance to deflection at relatively low unit weight. In order to illustrate this feature, flexural test data were obtained for commercial plywood core/sheet metal sandwich panel (used for trailer-van door construction) and for the panels of Examples 1 and 2. The test procedure involved the use of approximately 17″ by 23″ test panels. These test panels were set up on 17″ long supports so that the supports were parallel to the 17″ dimension and approximately 1½″ from each test panel edge, thus providing an unsupported span of about 20″. The unsupported span was then incrementally loaded uniformly across its midpoint by means of a 1″ diameter rod driven by an Instron tester. The load required to deflect the test panel 0.1″, 0.2″ and the load at test panel failure and The plywood core panels of Tests 1 and 2 are used commercially in the manufacture of trailer-van doors. It is evident that in such an application where weight and/or volume versus strength is an important practical consideration, the present panel construction can be put to advantageous use. Thus, for example, using the present sandwich panel construction as structural panel material for trailer-van doors, lighter and/or thinner doors can be utilized having strength and rigidity at least equal to heavier, thicker doors made of polywood core sandwich panel. The resultant reduction in weight and/or increase inin usable load space in the trailer-van provides a direct, immediate and measurable benefit in load carrying capacity of the trailer van.

Not only is the present sandwich construction stronger and more rigid per unit weight then a plywood core sandwich construction, the foamed metal core sandwich has important added characteristics of being substantially fire proof, of being free from core delamination and being substantially resistant to deterioration caused by ordinary weathering and aging.

Thus, besides its use in trailer-van doors, the present panel construction can be advantageously used in many other applications, such as fire doors, curtain walls, reactor shields, fire proof flooring, boat construction and the like.

Claims to the invention described herein follow.

We claim:

1. A sandwich panel construction comprising two outer layers attached to opposite sides of a foamed metal core.
2. The construction of claim 1 wherein said foamed metal is a foamed aluminum.
3. The construction of claim 2 wherein said formed aluminum has a density ranging from about 5 pounds per cubic foot to about 35 pounds per cubic foot.
4. The construction of claim 1 wherein said outer layers are of material independently selected from wood, metal, glass, thermoplastic organic polymers, thermoset organic polymers and elastomers.
5. The construction of claim 4 wherein said foamed metal is a foamed aluminum.
6. The construction of claim 5 wherein said foamed aluminum has a density ranging from about 5 to about 35 pounds per cubic foot.
7. The construction of claim 5 wherein said outer layers are bonded to said core with a thermoset epoxy resin adhesive.
8. The construction of claim 4 wherein said outer layers are discrete sheets.
9. The construction of claim 8 wherein said foamed metal is a foamed aluminum and said outer layers are attached to said core with a thermoset epoxy resin adhesive.
10. The construction of claim 9 wherein said foamed aluminum has a density of from 5 to about 35 pounds per cubic foot.
11. The construction of claim 10 wherein one of said outer layers is sheet aluminum and the other of said outer layers is sheet steel.
12. The construction of claim 11 wherein said steel is a galvanized steel.
13. The construction of claim 10 wherein both of said outer layers are sheet aluminum.
14. The construction of claim 6 wherein one of said outer layers is metal sheet and the other outer layer is fiberglass reinforced thermoset organic polymer.
15. The construction of claim 14 wherein said metal sheet is aluminum and said thermoset organic polymer is a polyester.
16. The construction of claim 2 wherein said foamed aluminum has a density of from about 8 to about 27 pounds per cubic foot.
17. The construction of claim 9 wherein said foamed aluminum has a density of from about 8 to about 27 pounds per cubic foot.
18. The construction of claim 14 wherein said foamed aluminum has a density of from about 8 to about 27 pounds per cubic foot.
19. The construction of claim 2 wherein said core has a thin integral aluminum skin.

References Cited

UNITED STATES PATENTS

| | | | |
|---|---|---|---|
| 2,542,048 | 2/1951 | Nagel | 161—218 |
| 3,321,351 | 5/1967 | Bader | 161—214 |
| 3,574,108 | 4/1971 | Lewis | 161—213 |
| 3,496,058 | 2/1970 | Schroter et al. | 161—160 |
| 2,875,117 | 2/1959 | Potchen et al. | 161—161 |
| 3,087,807 | 4/1963 | Allen et al. | 75—20 F |
| 3,214,265 | 10/1965 | Fiedler | 75—20 F |
| 3,305,902 | 2/1967 | Bjorksten | 75—20 F |

OTHER REFERENCES

A.P.C. Application of C. Dornier Ser. No. 212,074, published May 11, 1943.

WILLIAM J. VAN BALEN, Primary Examiner

U.S. Cl. X.R.

161—160, 166, 186, 190, 214, 215, 218, 219; 29—195